United States Patent [19]

Heitman et al.

[11] 3,842,262

[45] Oct. 15, 1974

[54] HIGH SPEED PHOTODIODE MOUNT

[75] Inventors: James M. Heitman; Earl F. Starr, Jr., both of Dayton, Ohio

[73] Assignee: The United States of America as represented by the Secretary of the United States Air Force, Washington, D.C.

[22] Filed: Nov. 12, 1973

[21] Appl. No.: 415,856

[52] U.S. Cl. ................ 250/239, 250/552, 339/94 L

[51] Int. Cl. ................ H01j 5/02

[58] Field of Search ................ 250/239, 551, 552; 317/235 N; 313/108 D; 339/91 L, 94 L, 94 C; 240/73 R, 73 BC, 73 QD

[56] References Cited

UNITED STATES PATENTS

| | | | |
|---|---|---|---|
| 3,524,068 | 8/1970 | Zorn | 250/239 |
| 3,535,525 | 10/1970 | Minkowitz | 250/239 |
| 3,668,612 | 6/1972 | Nepovim | 339/94 C |

*Primary Examiner*—James W. Lawrence
*Assistant Examiner*—D. C. Nelms
*Attorney, Agent, or Firm*—Harry A. Herbert, Jr.; Robert Kern Duncan

[57] ABSTRACT

A small, easily constructed, high speed, coaxially connected, photodiode mount is constructed by modifying two conventional seven-millimeter coaxial connectors so as to position the diode in the end of one connector. The flanges of the connectors are positioned in back-to-back relationship with insulation between them to form a coupling capacitor. The photodiode bias potential is impressed on the photodiode by making electrical connections to the flanges. A coaxial cable signal lead is conventionally connected to the other flange. The mount is held in a light and electric field shielding tube by insulating screws through holes in the flanges.

5 Claims, 6 Drawing Figures

PATENTED OCT 15 1974 3,842,262

HIGH SPEED PHOTODIODE MOUNT

BACKGROUND OF THE INVENTION

The field of the invention is in the art of mounting light sensitive cells.

With the advancing art of intelligence transmission by laser beams, photodiodes have become commercially available that are very small in size and capable of operation with very short pulses in optical high speed data link transmission circuits. Prior to the present invention photodiode mounts have been relatively large, cumbersome, devices and incapable of providing high response speeds with low distortion. Typical examples of the prior art devices are exemplified by U.S. Pat. Nos. 3,040,180 and 3,475,617 to patentees J. F. Healy and Jean-Claude A. Chaimowicz, respectively.

SUMMARY OF THE INVENTION

A small photodiode mount with "built-in" signal coupling capacitance and simplified dc biasing connection is provided that will not appreciably deteriorate detected pulses as short as $0.5 \times 10^{-9}$ second in duration.

DESCRIPTION OF THE PREFERRED EMBODIMENT

Figure 1:
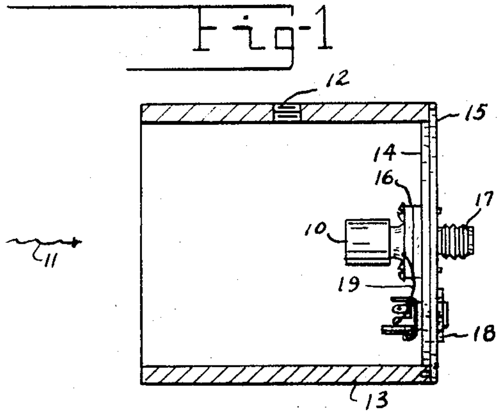
FIG. 1 is a representative view of an embodiment of the invention.

An embodiment of the invention with extraneous light and electric field shield is shown in FIG. 1. The complete assembly is conventionally supported for positioning in alignment with the incoming laser beam 11 by conventional attachment through tapped hole 12. The interior of the light shielding tube 13, the inside surface 14 of the end plate 15, and the exposed surfaces of the mount 10 are conventionally coated with a flat, black anti-reflective paint. Electrical connection is made through a conventional seven millimeter coaxial cable connector connecting to the coaxial fitting 17. A conventional grounded sleeve jack 18 connects to a conventional plug connected to the bias voltage source. The sleeve connector of jack 18 is electrically connected (grounded) to the end plate 15. The center connection is electrically connected by the wire conductor 19 to inner flange 16 of the mount.

Figures 3, 4, 5, 6:
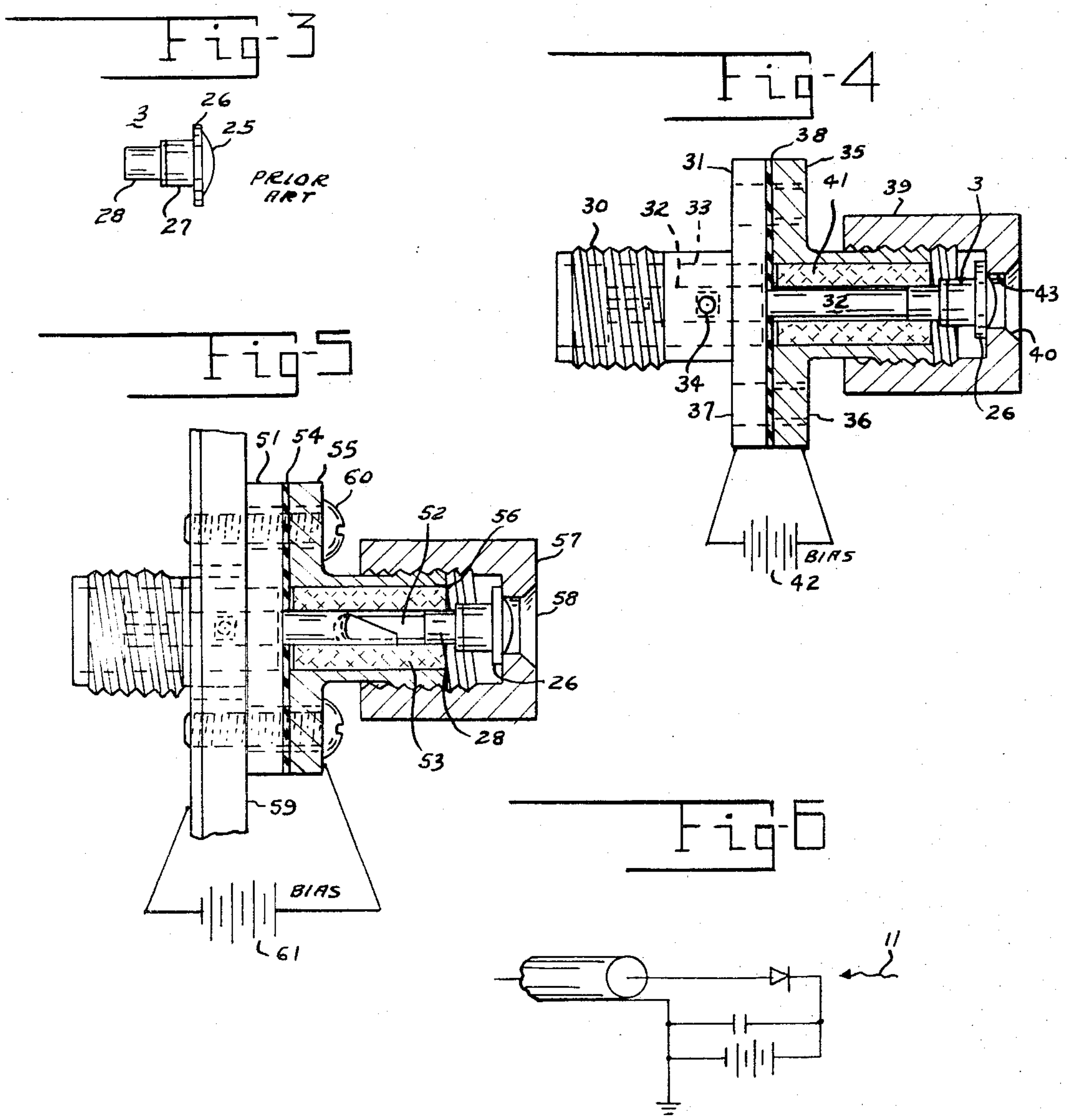
FIG. 3 is pictorial view of a typical commercially available photodiode.
FIG. 4 is a representative schematic view, in partial cross-section, of an embodiment of a diode mount of the invention.
FIG. 5 is a representative schematic view, in partial cross-section, of an embodiment of the invention fabricated in part from two conventional coaxial connectors.
FIG. 6 is an electrical schematic diagram representative of an embodiment of the invention.

An enlarged view of a typical, commercially available photodiode, such as a type T.I. No. XL55 photodiode, is shown in FIG. 3. These photodiodes are quite small, having typical overall axial lengths of approximately 0.150 inch. The lens 25 focuses the light beam on the photodiode contained within the structure. One electrical connection with the internal photodiode element is made through the conductive flange 26. Typically it has a diameter of approximately 0.120 inch, and a thickness of approximately 0.025 inch. The body 27, containing the photodiode, is fabricated of insulating material. It has an axial length of approximately 0.083 inch. The other electrical connection to the photodiode element is made through the cylindrical electrical conducting pin 28, whose dimensions are approximately 0.062 inch in axial length with a diameter of approximately 0.062 inch.

A typical embodiment of a mount for photodiode as shown in FIG. 3 is shown in the enlarged view of FIG. 4. A fitting 30 that connects with a conventional coaxial connector is fabricated integral with flange 31. The center conductor 32 receives the pin connector of the mating coaxial plug. The center conductor is surrounded by conventional insulating material 33, and is anchored in the assembly by cementing through hole 34 in the same manner that conventional flange-mount coaxial cable connectors are fabricated. A similar flange 35 having four tapped holes 36 in alignment with clearance holes 37 in flange 31, is cemented to flange 31 with an insulating cement 38 to provide a capacitance between the flanges. It has been found that a capacitance of approximately 100 pf formed between the flanges 31 and 35 is generally preferred for most applications. Two light coatings of insulating cement, such as Krylon "crystal clear spray coating" number 1302 has been found to be a suitable insulating cement. This material has a dielectric constant of approximately 3.2 to 3.7 at 1,000 Hertz and an electrical resistivity of approximately $10^{10}$ ohms per cubic centimeter.

Photodiode 3 is held in electrical compression contact with center conductor 32 by threaded diode retainer 39. This internally threaded cylindrical retainer has opening 40 to permit light entry to the lens of the photodiode. The aperture opening 43, should be slightly larger than the lens so that the retainer bears only on the diode flange 26. For the previously mentioned diode an aperture opening having a diameter approximately in the range of 0.078 to 0.082 inches has been found suitable. Brass is a suitable material from which to fabricate retainer 39. Insulating material 41 surrounding conductor 32 and supporting diode 3 is conventional insulating material as used in high frequency coaxial cable connectors. Ideally, diode connector 28 is a push fit into the insulator 41. The conventional diode bias voltage 42 is applied by electrical connections to flange 31 and flange 35. (For the type TIXL55 diode, approximately 160 volts is typical.) The diode mount is typically attached to a supporting surface by four conventional insulating machine screws (such as nylon screws) passing through the supporting surface, the clearance holes 37 in flange 31 and into the threaded holes 36 in flange 35.

The photodiode mount may be expediently fabricated by modifying two conventional flange mounting miniature coaxial cable connectors, such as the type O.S.M. number 215, as shown in FIG. 5. The first conventional flange connector 51 is modified by soldering a short length of electrical conductor (wire) 52 onto the end of the center conductor. The length of the wire is made such that the connector end 28 of the diode contacts the wire and just precludes the seating of the body of the diode on the insulator 53. It has also been found preferable to polish the base of the flange 51 next to the insulating material 54.

The second conventional flange mount coaxial connector 55 is modified by removing its center conductor.

(Slightly heating the center pin of the connector will aid in softening the cement holding it so that it may readily be extracted from the connector without damaging the remaining connector parts.) This leaves this connector with a hollow tubular passage through the insulating material 53. It is also advisable to polish the base of this flange that is next to the insulator 54. The second conventional coaxial connector 55 is further modified by facing off the threaded end of the connector down to just below the normally recessed end of the insulator 53 so as to provide a flat surface 56.

A diode retaining member 57 is fabricated from an electrical conductive material, such as brass, that will threadably engage the threads of the connector and provide a light passageway 58, as in the previous embodiment. As in the previous embodiment the retainer 57 makes electrical contact with the flange 26 of the diode. Conventional practice is to gold plate the electrical contacting surfaces of the retainer 57.

Figure 2:
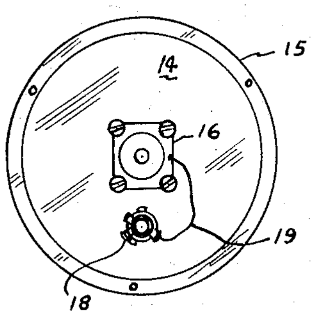
FIG. 2 is an inside view of the end plate of FIG. 1.

The insulating dielectric 54 between the flanges may be the insulating cement previously referred to. Another suitable dielectric material that may be used between the flanges is a layer of approximately one mil (0.001 inch) sheet Mylar material. The mount is conventionally attached to the supporting structure 59 (such as the end plate 14 of FIG. 2) by four insulating machine screws 60 passing through the holes in the connectors and threadably engaging the plate 59. Conventional diode bias voltage 61 is applied to the diode electrical circuit by making electrical connection to the plate 59, which is in electrical contact with flange 51, and with flange 55 which, through retainer 57, is electrically connected to the diode contact 26.

A representative electrical circuit of the invention is shown schematically in FIG. 6.

We claim:

1. A mount for a photodiode comprising:

a. a first flanged member having means for electrically connecting to a coaxial cable;

b. a second flanged member having means for supporting said photodiode;

c. an electrically conductive retaining member retaining the said photodiode and making electrical contact with the said photodiode and the said second flange member, and having an aperture for communicating light to said photodiode;

d. an electrically insulating member positioned between the said first flanged member and the said second flanged member forming a capacitance coupling between the said first and said second flange members;

e. means for attaching said flange members to a supporting surface; and f. means for applying a voltage across said photodiode.

2. The structure as claimed in claim 1 wherein the said supporting surface provides a light and electric field shield around the said photodiode.

3. A small, high speed, mount for receiving a light beam on a photodiode having two electrical connections comprising:

a. a first flanged member having an extended center conductor and means for electrically connecting to a coaxial cable;

b. a second flanged member having a tubular insulator that is coaxial with the said extended center conductor of the said first flanged member and that supports the said photodiode;

c. an electrically conductive retaining member cooperating with the said second flanged member retaining the said photodiode in the said insulating support and providing a first electrical connection of the said photodiode with the said extended center conductor of the said first flanged member and a second electrical connection of the said photodiode with the said second flanged member;

d. an aperture positioned in the said retaining member providing light entry to the said photodiode;

e. an electrically insulating member positioned between the flange of the said first flanged member and the flange of the said second flanged member providing a capacitance coupling between the said first flanged member and the said second flanged member;

f. means cooperating with the said first and second flanged members for positioning the said photodiode in light receiving relationship with the said light beam;

g. means cooperating with the said first flanged member and cooperating in insulating relationship with the said second flanged member for attaching the said flanged members to the said photodiode positioning means; and h. means for applying a voltage between the said first flanged member and the said second flanged member.

4. The apparatus as claimed in claim 3 wherein the positioning means cooperating with the said flanged members includes means for providing a light shield and an electric field shield around the said photodiode.

5. The apparatus as claimed in claim 4 wherein the said capacitance between the said flanged members provided by the insulating member is approximately 100 picofarad.

* * * * *